United States Patent
Broberg et al.

[11] Patent Number: 5,078,753
[45] Date of Patent: Jan. 7, 1992

[54] COATED ABRASIVE CONTAINING ERODABLE AGGLOMERATES

[75] Inventors: David E. Broberg, Woodbury; Ernest J. Duwell, St. Paul, both of Minn.; Richard J. Cosniano, Hudson, Wis.

[73] Assignee: Minnesota Mining and Manufacturing Company, St. Paul, Minn.

[21] Appl. No.: 594,337

[22] Filed: Oct. 9, 1990

[51] Int. Cl.$^5$ .......................... C09K 3/14; B24D 3/02
[52] U.S. Cl. ..................................... 51/298; 51/307; 51/309
[58] Field of Search ................... 51/298, 307, 308, 309

[56] References Cited

U.S. PATENT DOCUMENTS

| Re. 29,808 | 10/1978 | Wagner | 51/401 |
|---|---|---|---|
| 2,194,472 | 3/1940 | Jackson | 51/185 |
| 2,542,058 | 2/1951 | Riedesel | 51/185 |
| 3,232,729 | 2/1966 | Holland et al. | 51/298 |
| 4,311,489 | 1/1982 | Kressner | 51/298 |
| 4,314,827 | 2/1982 | Leitheiser et al. | 51/298 |
| 4,364,746 | 12/1982 | Bitzer et al. | 51/304 |
| 4,505,720 | 3/1985 | Gabor et al. | 51/295 |
| 4,547,204 | 10/1985 | Cane | 51/298 |
| 4,548,617 | 10/1985 | Miyatani et al. | 51/293 |
| 4,575,384 | 3/1986 | Licht et al. | 51/298 |
| 4,652,275 | 3/1987 | Bloecher et al. | 51/298 |
| 4,734,104 | 3/1988 | Broberg | 51/295 |
| 4,737,163 | 4/1988 | Larkey | 51/295 |
| 4,744,802 | 5/1988 | Schwabel | 51/309 |
| 4,751,138 | 6/1988 | Tumey et al. | 51/298 |
| 4,770,671 | 9/1988 | Monroe et al. | 51/293 |
| 4,799,939 | 1/1989 | Bloecher et al. | 51/293 |
| 4,881,951 | 11/1989 | Wood et al. | 51/309 |
| 4,903,440 | 2/1990 | Larson et al. | 51/298 |
| 4,927,431 | 5/1990 | Buchanan et al. | 51/298 |

FOREIGN PATENT DOCUMENTS 2417196 3/1976 Fed. Rep. of Germany.

Primary Examiner—William R. Dixon, Jr.
Assistant Examiner—Sue Hollenbeck
Attorney, Agent, or Firm—Gary L. Griswold; Walter N. Kirn; David L. Weinstein

[57] ABSTRACT

A coated abrasive product comprising a backing bearing on at least one major surface thereof a make coat, a multiplicity of erodable agglomerates comprising a resinous binder and at least one inorganic filler material adhered to said make coat, a multiplicity of individual premium abrasive grains adhered to said make coat and disposed between said erodable agglomerates, a multiplicity of individual premium abrasive grains overlying said erodable agglomerates, and a size coat overlying said individual premium abrasive grains, said erodable agglomerates, and said make coat. The coated abrasive products of this invention abrade faster and endure longer than coated abrasive products using individual conventional abrasive grains in place of erodable agglomerates.

20 Claims, 2 Drawing Sheets

COATED ABRASIVE CONTAINING ERODABLE AGGLOMERATES

BACKGROUND OF THE INVENTION

1. Field of the Invention

This invention relates to coated abrasives, and, more particularly, to coated abrasive products containing erodable agglomerates.

2. Discussion of the Art

Conventional coated abrasives typically consist of a single layer of abrasive grain adhered to a backing. It has been found that only up to about 15% of the grains in the layer are actually utilized in removing any of the workpiece. It follows then that about 85% of the grains in the layer are wasted. Furthermore, the backing, one of the more expensive components of the coated abrasive, must also be disposed of before the end of its useful life.

To overcome this problem of waste, many attempts have been made to distribute the abrasive grains on the backing in such a manner so that a higher percentage of the abrasive grains can be utilized, thus leading to extended life of the coated abrasive product The extended life further leads to fewer belt or disc changes by the operators, thereby saving time and reducing labor costs. It is apparent that merely depositing a thick layer of abrasive grains on the backing will not solve the problem, because the grains lying below the topmost grains are not likely to be used.

A highly desirable abrasive grain is marketed under the trademark "Cubitron". "Cubitron" abrasive grain is a non-fused synthetic alumina-based mineral optionally containing certain metal oxide or spinel or both additives. "Cubitron" abrasive grain is described in U.S. Pat. Nos. 4,314,827; 4,744,802; 4,770,671; and 4,881,951.

Although "Cubitron" grain provides excellent performance, it is much more expensive than conventional aluminum oxide grain. It has long been known that a coated abrasive containing an underlayer of conventional aluminum oxide grains and a top layer of "Cubitron" grains provides satisfactory performance at a lower cost than a coated abrasive using 100% "Cubitron" grains. However, for certain grinding applications, the conventional abrasive grains prevent maximum utilization of the "Cubitron" grains that are randomly distributed between the conventional grains. If these conventional grains do not break down fast enough, they tend to compete with the "Cubitron" grains for contact with the metallic workpiece and rub rather than remove metal. This prevents the "Cubitron" grains from fully penetrating into the metal to allow them to remove large amounts of metal.

SUMMARY OF THE INVENTION

In one embodiment, this invention provides a coated abrasive product comprising a backing bearing on at least one major surface thereof a make coat, a multiplicity of erodable agglomerates comprising a resinous binder and at least one inorganic filler material adhered to said make coat, a multiplicity of individual premium abrasive grains adhered to said make coat and disposed between said erodable agglomerates, a multiplicity of individual premium abrasive grains overlying said erodable agglomerates, and a size coat overlying said individual premium abrasive grains, said erodable agglomerates, and said make coat.

In another embodiment, this invention provides a coated abrasive product comprising a backing bearing on at least one major surface thereof a make coat, a multiplicity of erodable agglomerates comprising a resinous binder and at least one inorganic filler material adhered to said make coat, a multiplicity of individual premium abrasive grains adhered to said make Coat and disposed between said erodable agglomerates, and a size coat overlying said individual abrasive grains, said erodable agglomerates, and said make coat.

This invention further provides methods for making each the foregoing coated abrasive products. The method for preparing the first-mentioned coated abrasive embodiment comprises the steps of:

(1) providing a backing;
(2) applying a make coat to said backing;
(3) applying erodable agglomerates over said make coat;
(4) applying individual premium abrasive grains over said erodable agglomerates and said make coat;
(5) curing said make coat;
(6) applying a size coat over said erodable agglomerates, said individual premium abrasive grains, and said make coat; and
(7) curing said size coat.

The method for preparing the second-mentioned coated abrasive embodiment comprises the steps of:

(1) providing a backing;
(2) applying a make coat to said backing;
(3) applying a mixture comprising individual premium abrasive grains and erodable agglomerates over said make coat;
(4) curing said make coat;
(5) applying a size coat over said mixture of individual premium abrasive grains, said erodable agglomerates, and said make coat; and
(6) curing said size coat.

The coated abrasive products of this invention abrade faster and endure longer than coated abrasive products using individual conventional abrasive grains in place of erodable agglomerates.

DETAILED DESCRIPTION

Figure 1:
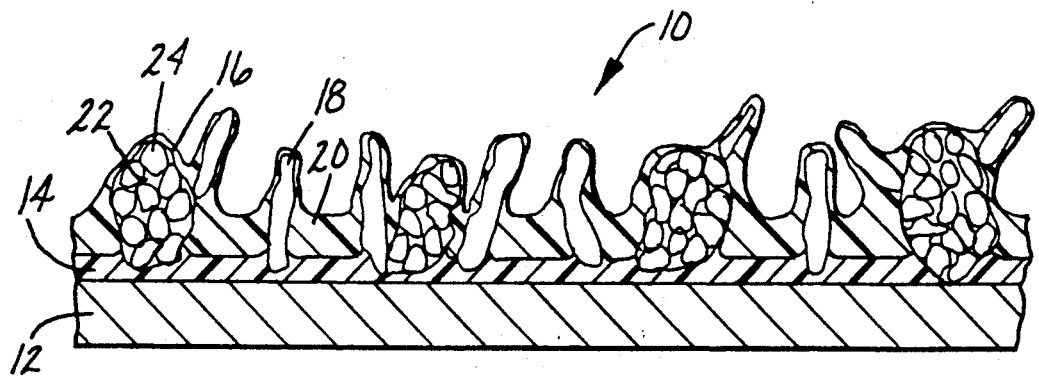
FIG. 1 is a schematic representation of a cross-section of one embodiment of a coated abrasive product of this invention.

Materials used in abrasive articles are often categorized according to their ability to abrade a surface. Materials capable of quickly abrading a surface are denoted "premium" while those that abrade a surface slowly, or not at all, are denoted "nonabrasive". Materials capable of abrading a surface at a moderate rate are denoted "conventional". The designation as premium, conventional, or nonabrasive involves a considerable degree of subjectivity, and depends to some degree on the type of workpiece and the abrading conditions employed. Nevertheless, for most commercially significant abrading operations, it has been found that a test involving the abrasion of cold rolled steel with coated abrasive products having only one type of grain, will, when compared to an identical construction involving a different type of grain, yield test results which are highly reliable in categorizing abrasive materials as premium, conventional, or nonabrasive.

To classify materials commonly used in abrasive articles as premium, conventional, or nonabrasive, abrasive discs containing Grade 36 abrasive grains (average grain size of 710 micrometers) were prepared. Conventional procedures for preparing coated abrasive products were followed, using conventional 0.76 mm thick vulcanized fiber backings, a conventional calcium carbonate-filled phenolic resin make coat, and a conventional cryolite-filled phenolic resin size coat. The weight of the make coat was 170 g/m$^2$. The resin of the make coat was precured for 90 minutes at 88° C. and the resin of the size coat precured for 90 minutes at 88° C. followed by final curing at 100° C. for 10 hours. The make and size coats were applied via conventional techniques in a one-trip operation and were cured in a forced air oven. The cured discs (17.8 cm diameter) were flexed in a conventional manner to controllably break the hard bonding resins, mounted on a beveled aluminum back-up pad, and used to grind a 1.25 cm by 18 cm face of a 1018 cold rolled steel workpiece. Each disc was driven at 5,500 rpm while the portion of the disc overlying the beveled edge of the back-up pad contacted the workpiece at a load of 5.91 kg. Grinding was conducted for one minute time intervals and each disc was used to grind a separate workpiece for a total of 12 minutes or until no more than 5 grams of metal were removed in any one minute grinding cut, whichever came first. This test was performed for different discs, each disc containing undiluted grains of one of the following materials: fused alumina-zirconia, ceramic aluminum oxide, heat-treated fused aluminum oxide, brown fused aluminum oxide, garnet, and marble. The total amount of metal (total cut) removed by using such discs is set forth in Table 1, along with the coating weights of the mineral and size coats. In each case, the total cut figure is the average for at least three discs.

TABLE 1

| Grain Designation | Coating Weight | | Total Cut (g) |
|---|---|---|---|
| | Grain (g/m$^2$) | Size (g/m$^2$) | |
| Fused alumina-zirconia | 920 | 700 | 969 |
| Ceramic aluminum oxide | 1060 | 700 | 1411 |
| Heat-treated aluminum oxide | 900 | 530 | 329 |
| Brown-fused aluminum oxide | 1060 | 700 | 371 |
| Garnet | 1270 | 700 | 209 |
| Marble | 530 | 540 | 22 |

If the total cut of a coated abrasive disc is greater than 500 grams, the abrasive grain is considered premium. If the total cut of a coated abrasive disc is less than 50 grams, the grain is considered nonabrasive. If the total cut of a coated abrasive disc is between 50 grams and 500 grams, the grain is considered conventional. Typically, nonabrasive diluent grains will cut considerably less than 50 grams. The stock removal of 1018 steel by nonabrasive diluent grains is not attributed to its cutting power but solely to the mechanical friction of the workpiece rubbing against the nonabrasive diluent grains.

The nonabrasive diluent grains defined above should not be confused with the abrasive grains denoted "inferior" in U.S. Pat. No. 4,734,104 and U.S. Pat. No. 4,737,163. The designation as a "superior" or "inferior" abrasive in these two references is a relative measurement between two different abrasive grain types. If a coated abrasive product containing one type of abrasive grain cuts over 10% more than an identical coated abrasive product containing a different type of abrasive grain, under identical test conditions, then the first type of abrasive grain is deemed "superior" and the second type "inferior". Thus, the designation as "superior" or "inferior" is a characteristic of the pair of abrasive grain types compared, not a measurement of the ultimate abrasiveness of the abrasive grain type so designated. The abrasive grain types denoted "inferior" are abrasive nonetheless and differ, therefore, from the nonabrasive diluent grains defined above.

One embodiment of a coated abrasive that may be produced according to this invention is illustrated in FIG. 1. As illustrated in FIG. 1, coated abrasive article 10 comprises a backing 12. Overlying backing 12 is a make coat 14 to which are adhered erodable agglomerates 16 and individual premium abrasive grains 18. A size coat 20 has been applied over make coat 14, erodable agglomerates 16, and individual premium abrasive grains 18. Erodable agglomerates 16 comprise a resinous binder 22 and inorganic particulate materials 24.

Figure 2:
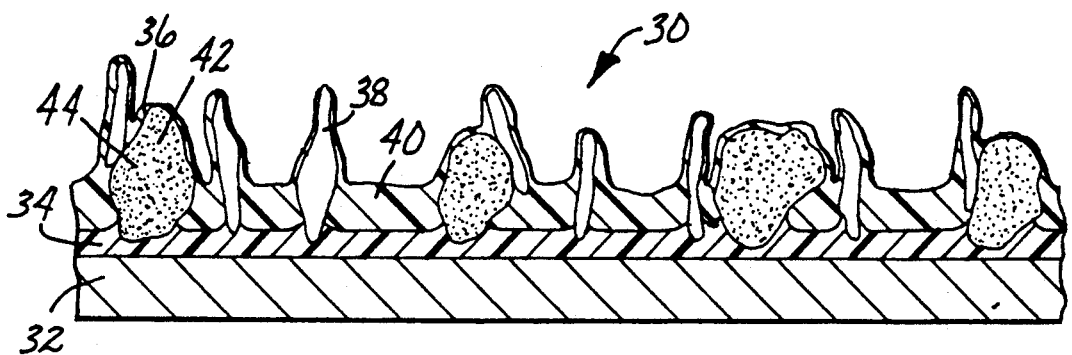
FIG. 2 is a schematic representation of a cross-section of another embodiment of a coated abrasive product of this invention.

Another embodiment of a coated abrasive that may be produced according to this invention is illustrated in FIG. 2. As illustrated in FIG. 2, coated abrasive article 30 comprises a backing 32. Overlying backing 32 is a make coat 34 to which are adhered erodable agglomerates 36 and individual premium abrasive grains 38. A size coat 40 has been applied over make coat 34, erodable agglomerates 36, and individual premium abrasive grains 38. Erodable agglomerates 36 comprise a resinous binder 42 and inorganic powdered materials 44.

Figure 3:
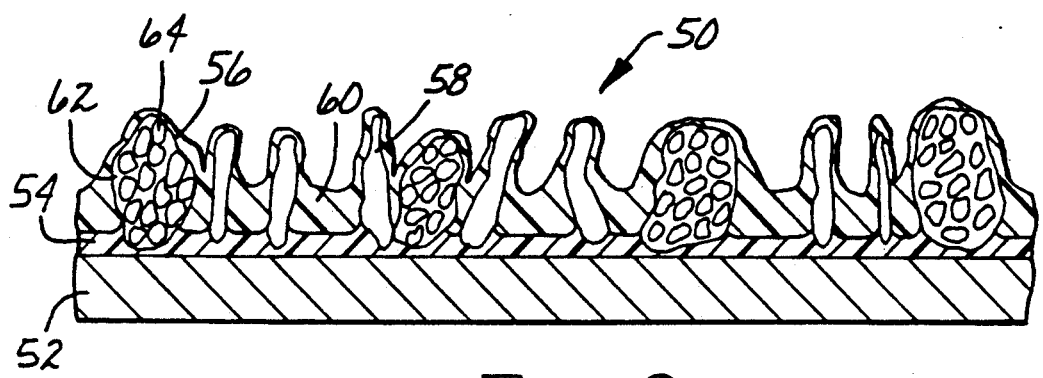
FIG. 3 is a schematic representation of a cross-section of another embodiment of a coated abrasive product of this invention.

Another embodiment of a coated abrasive that may be produced according to this invention is illustrated in FIG. 3. As illustrated in FIG. 3, coated abrasive article 50 comprises a backing 52. Overlying backing 52 is a make coat 54 to which are adhered erodable agglomerates 56 and individual premium abrasive grains 58. A size coat 60 has been applied over make coat 54, erodable agglomerates 56, and individual premium abrasive grains 58. Erodable agglomerates 56 comprise a resinous binder 62 and inorganic particulate materials 64.

The difference between the embodiments in FIG. 1 and FIG. 2 resides in the nature of the erodable agglomerates. In FIG. 1, erodable agglomerate 16 comprises a resinous binder 22 and inorganic particulate materials 24. In FIG. 2, erodable agglomerate 36 comprises a resinous binder 42 and inorganic powdered materials 44.

The difference between the embodiment in FIG. 3 and those of FIGS. 1 and 2 resides in the disposition of the individual premium abrasive grains In FIG. 3, all of the individual premium abrasive grains are adhered to the make coat; in FIGS. 1 and 2, a portion of the individual premium abrasive grains overlies the erodable agglomerates and are not disposed between adjacent erodable agglomerates.

Backing 12, and backings 32 and 52, that are suitable for this invention may be formed from any material that is compatible with the make coat and the components of the erodable agglomerates and that is capable of maintaining its integrity under expected curing and abrading conditions. It is preferable that the backing be in the form of a conformable, flexible sheet. Materials suitable for preparing backings of the coated abrasives of the present invention are well known in the art and include fiber, polymeric film, paper, woven and non-woven fabric, and foils.

Erodable agglomerates 16, and erodable agglomerates 36 and 56, that are suitable for this invention comprise (a) a resinous binder and (b) at least one inorganic filler material in the binder. In order for the agglomerates to be erodable, the resinous binder must be erodable.

Representative examples of erodable agglomerates that are suitable for the coated abrasive of the present invention are described in U.S. Pat. Nos. 4,652,275 and 4,799,939, incorporated herein by reference. An erodable agglomerate preferred for the coated abrasive of the present invention comprises a binder preferably made from phenolic resin, and an inorganic filler, such as sodium cryolite or ammonium cryolite. Other erodable agglomerates suitable for the coated abrasive of the present invention are described in U.S. Pat. Nos. Re. 29,808; 4,311,489; and German Auslegeschrift No 2,417,196.

Materials suitable for the resinous binder of the erodable agglomerates include phenolic resins, urea formaldehyde resins, urethane resins, polyester resins, acrylate resins, epoxy resins, and hide glue. Although hide glue is not a resin, it is suitable for use as the resinous binder of the erodable agglomerates. The preferred resin for the erodable binder is phenolic resin.

Filler materials suitable for the erodable agglomerate include inorganic powdered materials, inorganic particulate materials, or both.

Inorganic powdered filler materials suitable for the erodable agglomerates include conventional filler materials, e.g., cryolites, such as, for example, sodium cryolite, potassium cryolite, ammonium cryolite, fluoroborates, such as, for example, potassium tetrafluoroborate ($KBF_4$), sodium tetrafluoroborate ($NaBF_4$), and ammonium tetrafluoroborate, silicon fluorides, such as, for example, sodium hexafluorosilicate ($Na_3SiF_6$) and potassium hexafluorosilicate ($K_3SiF_6$), carbonates, such as, for example, calcium carbonate ($CaCO_3$), sulfates, such as, for example, sodium sulfate ($Na_2SO_4$), hydroxides, such as, for example, aluminum hydroxide monohydrate ($Al(OH)_3 \cdot H_2O$) and aluminum hydroxide trihydrate ($Al(OH)_3 \cdot 3H_2O$), silica, such as, for example, glass beads, and silicates, for example, talc, etc.

Inorganic particulate filler materials suitable for the erodable agglomerate include abrasive minerals, such as, for example, fused aluminum oxide, such as corundum, ceramic aluminum oxide, silicon carbide, silicon nitride coated silicon carbide (SNAG), aluminum zirconia, diamond, cubic boron nitride, boron carbide, tungsten carbide, flint, quartz ($SiO_2$), emery, garnet, etc.

Inorganic particulate filler materials suitable for the erodable agglomerate include non-abrasive materials, such as, for example, marble ($CaCO_3$), gypsum ($CaSO_4$), and vermiculite.

Organic filler materials can optionally be added to the erodable agglomerates. Organic filler materials include such materials as wood pulp and wood flour.

The size of the filler materials in the erodable agglomerate depends on their physical form. The size of inorganic powdered filler material can range from 0.5 micrometer to 200 micrometers, preferably from 10 micrometers to 50 micrometers. The size of individual abrasive grains in the erodable agglomerate must be small enough to provide multiplicity of individual grains within the erodable agglomerate. The size of inorganic particulate filler material can range from 50 micrometers to 700 micrometers, preferably from 170 micrometers to 650 micrometers. These ranges correspond to a screen size of grade 240 and coarser. The size of the powdered filler material is based on a diameter typically measured by means of an aperture technique, such as a Coulter counter. The size of the particulate filler material is based on screen size.

The percentage of filler materials in the erodable agglomerate depends on the nature of the filler material. For particulate material only, the filler can comprise from about 5% to about 90% by weight of the agglomerate. For powdered material only, the filler can comprise from about 5% to about 90% by weight of the agglomerate, preferably 50% to 70% by weight of the agglomerate. If an agglomerate contains both particulate filler material and powdered filler material, it is preferred that it contain from about 5% to about 15% by weight powdered filler material.

The range of size for the erodable agglomerates is dependent upon the range of size for the individual premium abrasive grains. In general, the ratio of the size of the individual premium abrasive grains, to the size of the erodable agglomerates can range from about 2.5:1 to about 0.5:1. If the erodable agglomerates are too small, relative to the individual premium abrasive grains, insufficient support will be given to the individual premium abrasive grains and performance will be adversely affected. If the erodable agglomerates are too large, relative to the individual premium abrasive grains, the erodable agglomerates could prevent the individual premium abrasive grains from contacting the workpiece. The size of the erodable agglomerates can range from 300 to 1,500 micrometers, and preferably ranges from 500 to 1,200 micrometers. As the size of the erodable agglomerates decreases, their ability to erode also decreases, which results in a decrease in grinding performance.

The erodable agglomerates suitable for use in the present invention can be prepared by the following procedure. Inorganic filler materials, e.g., abrasive grains, powdered filler materials, and resin, are introduced into a mixing vessel, and the resulting mixture stirred until it is homogeneous. It is preferred that there be sufficient liquid in the mixture that the resulting mixture not be excessively stiff or excessively runny. Most resins contain sufficient liquid to permit adequate mixing. After the mixing step is complete, the mixture is caused to solidify, preferably by means of heat or radiation. Solidification results from removal of the liquid from the mixture. In the case of resinous binders, solidification also results from curing of the resin. After the mixture is solidified, it is crushed into the form of agglomerates and graded to the desired size. Devices suitable for this step include conventional jaw crushers and roll crushers.

The crushing and grading procedures necessary to obtain agglomerates as described frequently results in the agglomerates being of an undesirable size range, and they can either be recycled, e.g., by being added to a new dispersion, or discarded.

Abrasive grains that are suitable for the individual premium abrasive grains 18, and abrasive grains 38 and 58, of the present invention include ceramic aluminum oxide (such as, for example, "Cubitron", commercially available from Minnesota Mining and Manufacturing Company and described in U.S. Pat. Nos. 4,314,827; 4,744,802; 4,770,671; and 4,881,951, all of which are incorporated herein by reference), alumina zirconia, silicon nitride coated silicon carbide (SNAG), tungsten carbide, cubic boron nitride, boron carbide, and diamond. SNAG can be prepared according to U.S. Pat. No. 4,505,720, incorporated herein by reference.

The coated abrasive of this invention is preferably prepared by applying a make coat over the backing, drop coating the erodable agglomerates over the make coat, electrostatically coating individual premium abrasive grains over the layer of erodable agglomerates, curing the make coat, applying a size coat, and then curing the thus-applied coatings. The make coat and size coat can be made from conventional materials, e.g., phenolic resins, urea-formaldehyde resins, epoxy resins, hide glue, and varnish. Examples of materials suitable for preparing the make coat and size coat of the coated abrasives of this invention are described in Leitheiser, U.S. Pat. No. 4,314,827, incorporated herein by reference. Care should be taken so that the size coat does not adversely affect erodability of the erodable agglomerates, i.e., the size coat must be very thin so as not to flood the surface of the coated abrasive. It is also contemplated that radiation-curable resins can also be used for the make coat, size coat, or both. Examples of radiation-curable resins are described in U.S. Pat. Nos. 4,751,138; 4,903,440, and 4,927,431, incorporated herein by reference for the radiation-curable resins described therein.

It is also within the scope of this invention to apply a supersize coat over the size coat. A supersize coat will typically comprise a binder and a grinding aid. In a preferred supersize coat, the binder is an epoxy resin and the grinding aid is potassium fluoroborate.

The coating weight of the erodable agglomerates can range from 40 to 150 grains/4 in.×6 in. (167 to 628 g/m$^2$), preferably 90 to 110 grains/4 in.×6 in. (377 to 460 g/m$^2$). The coating weight of the individual premium abrasive grains can range from 50 to 250 grains/4 in.×6 in. (209 to 1,047 g/m$^2$), preferably 90 to 100 grains/4 in.×6 in (377 to 419 g/m$^2$). The volume of erodable agglomerates to the volume of individual premium abrasive grains can range from 0.08:1 to 1.75:1, preferably 0.5:1 to 1:1. The foregoing coating weight ranges are based on agglomerates of grade 24.

The individual premium abrasive grains can be applied as either an open coat or a closed coat. It is preferable, from the standpoint of cost, to apply the premium abrasive grains as an open coat.

The following non-limiting examples will further illustrate the present invention. The weight expressed in the tables are expressed as weight of material per unit area.

In the following examples, three types of tests were employed to evaluate performance of the coated abrasives of this invention. These tests are described below.

Edge Test

The edge test apparatus included an electric motor which drove a shaft at 3,400 rpm and a 16.5 cm (6.5 inch) diameter back-up plate which was attached for rotation about the shaft. An abrasive disc test sample was held to the back-up pad by a retainer plate. The apparatus was positioned such that the motor shaft made an 18.5° angle with respect to vertical. The edge of a 14 gauge (0.19 cm thick), 30.5 cm (12 inches) diameter plate comprised of either cold rolled steel or 304 stainless steel was contacted with the outer edge of the abrasive disc under 2,896 gram load. The circular plate was rotated at 2 rpm.

Flat Test

The flat test apparatus was similar to the edge test apparatus except that the motor shaft made a 7° angle with respect to vertical and the abrasive disc was placed in contact with the edge of the circular plate under a 2,670 gram load such that the contact area of the abrasive disc was about 1.3 centimeters (0.5 inches) from the outer edge of the disc.

In both tests, the substrate was weighed before and after an eight minute run of the test device to determine the amount of metal removed.

Hydraulic Slide Action Test

Figure 4:
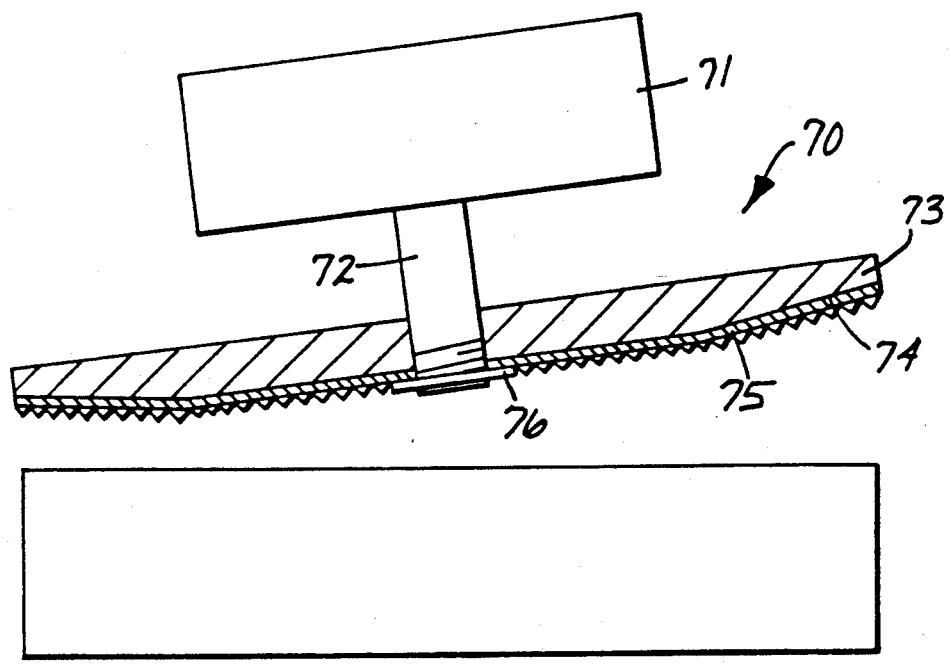
FIG. 4 is a drawing of an apparatus for testing the abrasiveness of abrasive discs.

The testing apparatus is depicted in FIG. 4 of the drawing. The apparatus 70 includes air motor 71 which drives a shaft 72 at 5,000 rpm with a 7 inch (17.8 cm) diameter aluminum back-up plate 73 having a beveled face 74 to which test coated abrasive disc 75 is attached and held in place by retainer 76. Back-up plate 78 has a 1 inch (2.5 cm) wide peripheral bevel at an angle of 6° with respect to its back surface.

The device was positioned with a hydraulic motor shaft at an angle above a one-half inch wide (1.27 cm) by 8 inch long (20.3 cm) 1018 low carbon steel workpiece bar so that the portion of the abrasive disc on the beveled portion of the back-up plate pad was approximately parallel to the surface of the workpiece to prevent retainer 76 from contacting the surface of the workpiece during grinding. A 13 pound (5.9 kg) load was applied to the grinder while the workpiece was caused to reciprocate 7 inches (17.8 cm) back and forth in a direction perpendicular to the applied load. Under such conditions, the abrasive grinding area was one-half square inch (3.2 square cm), resulting in a load of 26 lbs/in$^2$ (1.8 kg/cm$^2$).

The test was run by grinding a pre-weighed workpiece for 1 minute then reweighing the workpiece to obtain the weight of metal removed. This procedure was repeated 12 times, using a set of 12 fresh workpiece bars at substantially room temperature and a total was obtained by adding the weight of the steel removed from each of the 12 workpieces. When a test was completed for 12 sequences, the total weight removed for 12 minutes was recorded.

EXAMPLE I

This example illustrates the effect of the nature of inorganic particles in the erodable agglomerates.

Resinous binder (resole phenol-formaldehyde), an inorganic filler (sodium cryolite), and an organic filler (10% aqueous dispersion of wood pulp) were introduced into a Hobart mixer, and the resulting mixture was mixed for five minutes therein. To separate portions of the mixture were added different inorganic abrasive filler materials or inorganic non-abrasive filler materials. For run no. 1, the inorganic filler material was heat-treated aluminum oxide (grade 50). For run no. 2, the inorganic filler material was conventional brown fused aluminum oxide (grade 50). For run no. 3, the inorganic filler material was marble (capable of passing 30 mesh screen, being retained on 80 mesh screen). The amount of each ingredient for each of runs 1, 2, and 3 is set forth below:

| | Amount (g) in run | | |
|---|---|---|---|
| Ingredient | 1 | 2 | 3 |
| Resole phenol-formaldehyde | 9.1 | 9.1 | 11.9 |
| Sodium cryolite | 9.1 | 9.1 | 11.9 |
| Wood pulp | 5.7 | 5.7 | 7.4 |
| Heat-treated aluminum oxide | 76.1 | 0 | 0 |
| Brown-fused aluminum oxide | 0 | 76.1 | 0 |
| Marble | 0 | 0 | 68.8 |

The resulting mixtures were mixed for an additional five to ten minutes. Each mixture, which was in the form of a doughy mass, was then spread out onto a sheet of polyethylene and cured for one hour at 150° F., one hour at 190° F., four hours at 208° F., and 16 hours at 215° F.

Each cured material was run through a jaw crusher to reduce its size and then crushed and screened three times to reduce it to a size capable of passing through a 14 mesh screen, but not capable of passing through a 35 mesh screen.

The coated abrasives were prepared by first applying a make coat of uniform thickness to a 30 mil thick, 7 inch diameter vulcanized fiber disc. The make coat was a calcium carbonate filled resole phenolic resin (52% by weight $CaCO_3$). Then the appropriate erodible agglomerates were uniformly drop coated onto the make coat. A layer of "Cubitron" abrasive grains (grade 24), commercially available from Minnesota Mining and Manufacturing Company, was then applied using electrostatic coating techniques. The coating weight of the erodible agglomerates was corrected for bulk density to give approximately the same particle volume as the drop coated mineral of the control discs. Control discs were made in which the layer of drop coated material was heat-treated aluminum oxide (grade 24), instead of erodible agglomerates. The weight of this material was 0.800 $kg/m^2$. The make coat was pre-cured for about 20 minutes at 150° F. (65.6° C.) and three hours at 190° F. (87.7° C.). Then a size coat was uniformly applied over the layer of "Cubitron" abrasive grains. The size coat was a cryolite filled resole phenolic resin (68% by weight cryolite). The make coat and size coat were cured for 24 hours at 212° F. (100° C.). These discs were tested by the high pressure edge test, medium pressure flat test at two loads, and on the low pressure hydraulic slide action test.

The results are set forth in Table 2.

TABLE 2

| Run no. | Weight of make coat ($kg/m^2$) | Weight of size coat ($kg/m^2$) | Weight of agglomerate coat ($kg/m^2$) | Weight of premium grain coat ($kg/m^2$) | Edge test[1] Amount removed (g) | Edge test[1] Percent of control (%) |
|---|---|---|---|---|---|---|
| Control | .377 | .523 | — | .393 | 190 | 100 |
| 1 | .377 | .523 | .460 | .393 | 244 | 128 |
| 2 | .377 | .523 | .460 | .393 | 209 | 110 |
| 3 | .377 | .523 | .398 | .393 | 183 | 96 |

| Run no. | Flat test[2] Amount removed (g) | Flat test[2] Percent of control (%) | Flat test[3] Amount removed (g) | Flat test[3] Percent of control (%) | Hydraulic slide action test[4] Amount removed (g) | Hydraulic slide action test[4] Percent of control (%) |
|---|---|---|---|---|---|---|
| Control | 118 | 100 | 201 | 100 | 1005 | 100 |
| 1 | 134 | 114 | 237 | 118 | 1114 | 111 |
| 2 | 138 | 117 | 244 | 121 | 1154 | 115 |
| 3 | 141 | 119 | 215 | 107 | 1106 | 110 |

[1]Load was 2,896 g; normalized load was 2.3 × $10^5$ $kg/m^2$.
[2]Load was 2,670 g; normalized load was 1.1 × $10^5$ $kg/m^2$.
[3]Load was 4,000 g; normalized load was 1.6 × $10^5$ $kg/m^2$.
[4]Load was 5,902 g; normalized load was 0.2 × $10^5$ $kg/m^2$.

The foregoing results show that a coated abrasive containing erodible agglomerate outperforms the control. At higher grinding loads (edge test and flat test at 1.6 × $10^5$ $kg/m^2$), coated abrasives containing erodible agglomerates containing tough, abrasive inorganic particles (run nos. 1 and 2) outperformed those containing friable, non-abrasive inorganic particles (run no. 3), whereas at moderate grinding loads (flat test at 1.1 × $10^5$ $kg/m^2$), the coated abrasives containing erodible agglomerates containing the friable, non-abrasive inorganic particles outperformed those containing the tough, abrasive inorganic particles.

EXAMPLE II

In this example, the effect of the percentage of abrasive inorganic particles in the erodible agglomerate is illustrated. Erodible agglomerates containing heat-treated aluminum oxide were made in the same manner as those of Example I, run no. 1, with the exception that the percentage of aluminum oxide in each run was varied. The results are set forth in Table 3.

TABLE 3

| Run no. | Percentage of $Al_2O_3$ in agglomerate | Weight of make coat ($kg/m^2$) | Weight of size coat ($kg/m^2$) | Weight of agglomerate coat ($kg/m^2$) | Weight of premium grain coat ($kg/m^2$) | Edge test[2] Amount removed (g) | Edge test[2] Percent of control (%) | Flat test[3] Amount removed (g) | Flat test[3] Percent of control (%) |
|---|---|---|---|---|---|---|---|---|---|
| Control | — | .377 | .628 | — | .393 | 238 | 100 | 132 | 100 |
| 4 | 90 | .377 | .649 | .443 | .393 | 252 | 106 | 154 | 117 |
| 5 | 82 | .377 | .649 | .419 | .393 | 243 | 102 | 148 | 112 |
| 6 | 67 | .377 | .607 | .381 | .393 | 264 | 111 | 153 | 116 |
| 7 | 40 | .377 | .565 | .280 | .393 | 255 | 107 | 160 | 121 |

TABLE 3-continued

| Run no. | Percentage of Al$_2$O$_3$ in agglomerate | Weight of make coat (kg/m$^2$) | Weight of size coat (kg/m$^2$) | Weight of agglomerate coat (kg/m$^2$) | Weight of premium grain coat (kg/m$^2$) | Edge test[2] Amount removed (g) | Edge test[2] Percent of control (%) | Flat test[3] Amount removed (g) | Flat test[3] Percent of control (%) |
| --- | --- | --- | --- | --- | --- | --- | --- | --- | --- |
| 8[1] | 0 | .377 | .586 | .205 | .393 | 239 | 100 | 166 | 126 |

[1]The agglomerate for run no. 8 was prepared by combining 33.3 parts by weight phenolic resin, 44.4 parts sodium cryolite, 22.2 parts by weight wood pulp, and 0 parts by weight mineral.
[2]Load was 2,896 g; normalized load was 2.3 × 10$^5$ kg/m$^2$.
[3]Load was 2,670 g; normalized load was 1.1 × 10$^5$ kg/m$^2$.

The foregoing results show that the effect on performance of the percentage of heat-treated aluminum oxide in the erodable agglomerate depends on the grinding conditions. At very high pressures, optimum performance occurs at 40 to 82% heat-treated aluminum oxide, whereas at moderately high pressures, a lower concentration of heat-treated aluminum oxide is optimal.

EXAMPLE III

In this example, the effect of size of the particles in the erodable agglomerate is illustrated. Erodable agglomerates containing heat-treated aluminum oxide were prepared in the same manner as those of Example I, with the exception that the particle size of the aluminum oxide grains was varied. The results are set forth in Table 4.

taining heat-treated aluminum oxide were made in the same manner as those of Example I, run no. 1, with the exception that the size range of the erodable agglomerates was varied. The results are set forth in Table 5.

TABLE 5

| Run no. | Size range of agglomerates (μm) | Weight of make coat (kg/m$^2$) | Weight of size coat (kg/m$^2$) | Weight of agglomerate coat (kg/m$^2$) | Weight of premium grain coat (kg/m$^2$) | Edge test[1] Amount removed (g) | Edge test[1] Percent of control (%) | Flat test[2] Amount removed (g) | Flat test[2] Percent of control (%) |
| --- | --- | --- | --- | --- | --- | --- | --- | --- | --- |
| Control | — | .377 | .628 | — | .393 | 226 | 100 | 134 | 100 |
| 13 | 1190–500 | .377 | .670 | .419 | .393 | 227 | 100 | 160 | 119 |
| 14 | 1190–1000 | .377 | .607 | .419 | .393 | 228 | 101 | 157 | 117 |
| 15 | 840–711 | .377 | .649 | .419 | .393 | 225 | 100 | 153 | 114 |
| 16 | <711 | .377 | .649 | .419 | .393 | 193 | 85 | 153 | 114 |

[1]Load was 2,896 g; normalized load was 2.3 × 10$^5$ kg/m$^2$.
[2]Load was 2,670 g; normalized load was 1.1 × 10$^5$ kg/m$^2$.

The foregoing results show that erodable agglomerates having a size of at least 711 μm (similar to the size range of the grade 24 "Cubitron" grain) are necessary to maintain the same grinding performance as the control on the high pressure edge test.

EXAMPLE V

In this example, the effect of powdered inorganic filler in erodable agglomerates is illustrated. The erodable agglomerates of run no. 17 were prepared in the same manner as that described in Example I, run no. 1. The erodable agglomerates of run nos. 18, 19, and 20 were prepared in the same manner as that described in

TABLE 4

| Run no. | Grade of mineral in agglomerate | Weight of make coat (kg/m$^2$) | Weight of size coat (kg/m$^2$) | Weight of agglomerate coat (kg/m$^2$) | Weight of premium grain coat (kg/m$^2$) | Edge test[1] Amount removed (g) | Edge test[1] Percent of control (%) | Flat test[2] Amount removed (g) | Flat test[2] Percent of control (%) |
| --- | --- | --- | --- | --- | --- | --- | --- | --- | --- |
| Control | — | .377 | .628 | — | .393 | 238 | 100 | 132 | 100 |
| 9 | 36 | .377 | .586 | .498 | .393 | 236 | 99 | 144 | 109 |
| 10 | 50 | .377 | .649 | .419 | .393 | 243 | 102 | 148 | 112 |
| 11 | 60 | .377 | .607 | .385 | .393 | 243 | 102 | 153 | 116 |
| 12 | 80 | .377 | .649 | .360 | .393 | 183 | 77 | 157 | 119 |

[1]Load was 2,896 g; normalized load was 2.3 × 10$^5$ kg/m$^2$.
[2]Load was 2,670 g; normalized load was 1.1 × 10$^5$ kg/m$^2$.

The foregoing results show that the effect on performance of particle size in the erodable agglomerate is influenced by the grinding test conditions. In the edge test (high grinding pressure), larger abrasive particles in the erodable agglomerate enhance performance whereas in the flat test (medium pressure), the smaller abrasive particles in the erodable agglomerate enhance performance.

EXAMPLE IV

In this example, the effect of size of the erodable agglomerates is illustrated. Erodable agglomerates con- Example II, run no. 8, except for the type of filler. The control was prepared in the same manner as the control of Example I. The erodable agglomerates of run no. 21 were prepared in the same manner as that described in Example II, run no. 8, except no filler or wood pulp was used. Fiber discs similar to those in Example I were prepared. Their performance was determined on the edge and flat tests and compared to that of the control discs and discs prepared with erodable agglomerates containing heat-treated aluminum oxide (grade 50) as described in Example I. The results are set forth in Table 6.

TABLE 6

| | Weight of | Weight of | Weight of agglomerate |

TABLE 6-continued

| Run no. | Mineral in agglomerate | Filler in agglomerate | make coat (kg/m²) | size coat (kg/m²) | coat (kg/m²) |
|---|---|---|---|---|---|
| Control | — | — | .377 | .586 | — |
| 17 | 82% | Sodium cryolite | .377 | .607 | .419 |
| 18 | 0 | Sodium cryolite | .377 | .544 | .209 |
| 19 | 0 | Ammonium cryolite | .377 | .607 | .159 |
| 20 | 0 | Calcium carbonate | .377 | .565 | .184 |
| 21 | 0 | — | .377 | .502 | .197 |

| | | Edge test[1] | | Flat test[2] | |
|---|---|---|---|---|---|
| Run no. | Weight of premium grain coat (kg/m²) | Amount removed (g) | Percent of control (%) | Amount removed (g) | Percent of control (%) |
| Contol | .393 | 212 | 100 | 122 | 100 |
| 17 | .393 | 239 | 113 | 150 | 123 |
| 18 | .393 | 223 | 105 | 158 | 130 |
| 19 | .393 | 217 | 102 | 200 | 164 |
| 20 | .393 | 178 | 84 | 134 | 110 |
| 21 | .393 | 184 | 87 | 127 | 104 |

[1]Load was 2,896 g; normalized load was $2.3 \times 10^5$ kg/m².
[2]Load was 2,670 g; normalized load was $1.1 \times 10^5$ kg/m².

The foregoing results show that the type of filler influences the performance of the disc on both the edge test and flat test. The coated abrasive of run no. 19, which contained ammonium cryolite, outperformed the control by 164% on the flat test, whereas the control outperformed the coated abrasive of run no. 20, which contained calcium carbonate, by 16% and the coated abrasive of run no. 21, which contained no filler, by 13% on the edge test.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Coated abrasive product comprising a backing bearing on one major surface thereof a make coat, a multiplicity of erodable agglomerates comprising a resinous binder and a filler consisting essentially of inorganic, non-abrasive filler material adhered to said make coat, a multiplicity of individual premium abrasive grains adhered to said make coat and disposed between said erodable agglomerates, a multiplicity of individual premium adhesive grains overlying said erodable agglomerates, and a size coat overlying said individual premium abrasive grains, said erodable agglomerates, and said make coat.

2. The coated abrasive product of claim 1, wherein said resinous binder of said agglomerates is selected from the group consisting of phenolic resins, urea formaldehyde resins, urethane resins, polyester resins, acrylate resins, epoxy resins, and hide glue.

3. The coated abrasive product of claim 1, wherein said inorganic, non-abrasive filler material is in the form of a powder.

4. The coated abrasive product of claim 3, wherein said inorganic, non-abrasive filler material is selected from the group consisting of cryolites, fluoroborates, silicon fluorides, carbonates, sulfates, hydroxides, silica, and silicates.

5. The coated abrasive product of claim 1, wherein said inorganic, non-abrasive filler material is in the form of a particle.

6. The coated abrasive product of claim 5, wherein said inorganic, non-abrasive filler material is selected from the group consisting of marble, gypsum, and vermiculite.

7. The coated abrasive product of claim 1, wherein said inorganic, non-abrasive filler material includes both filler material in the form of a powder and filler material in the form of a particle.

8. The coated abrasive product of claim 1, wherein the ratio of size of said premium abrasive grains to said erodable agglomerates ranges from about 2.5:1 to about 0.5:1.

9. The coated abrasive product of claim 1, wherein said erodable agglomerate further includes an organic filler material.

10. The coated abrasive product of claim 1, wherein said individual premium abrasive grains are selected from the group consisting of ceramic aluminum oxide, alumina zirconia, silicon nitride coated silicon carbide, tungsten carbide, cubic boron nitride, boron carbide, and diamond.

11. Coated abrasive product comprising a backing bearing on one major surface thereof a make coat, a multiplicity of erodable agglomerates comprising a resinous binder and a filler consisting essentially of inorganic, non-abrasive filler material adhered to said make coat, a multiplicity of individual premium abrasive grains adhered to said make coat and disposed between said erodable agglomerates, and a size coat overlying said individual abrasive grains, said erodable agglomerates, and said make coat.

12. The coated abrasive product of claim 11, wherein said resinous binder of said agglomerates is selected from the group consisting of phenolic resins, urea formaldehyde resins, urethane resins, polyester resins, acrylate resins, epoxy resins, and hide glue.

13. The coated abrasive product of claim 11, wherein said inorganic, non-abrasive filler material is in the form of a powder.

14. The coated abrasive product of claim 11, wherein said inorganic, non-abrasive filler material is selected from the group consisting of cryolites, fluoroborates, silicon fluorides, carbonates, sulfates, hydroxides, silica, and silicates.

15. The coated abrasive product of claim 11, wherein said inorganic, non-abrasive filler material is in the form of a particle.

16. The coated abrasive product of claim 15, wherein said inorganic, non-abrasive filler material is selected from the group consisting of marble, gypsum, and vermiculite.

17. The coated abrasive product of claim 11, wherein said inorganic, non-abrasive filler material includes both filler material in the form of a powder and filler material in the form of a particle.

18. The coated abrasive product of claim 11, wherein said erodable agglomerates ranges from about 2.5:1 to about 0.5:1.

19. The coated abrasive product of claim 11, wherein said erodable agglomerate further includes an organic filler material.

20. The coated abrasive product of claim 11, wherein said individual premium abrasive grains are selected from the group consisting of ceramic aluminum oxide, alumina zirconia, silicon nitride coated silicon carbide, tungsten carbide, cubic boron nitride, boron carbide and diamond.

* * * * *

UNITED STATES PATENT AND TRADEMARK OFFICE
CERTIFICATE OF CORRECTION

PATENT NO. : 5,078,753
DATED : January 7, 1992
INVENTOR(S) : Broberg et al.

It is certified that error appears in the above-identified patent and that said Letters Patent is hereby corrected as shown below:

Title Page:
Item [75] Inventors, third line, "Richard J. Cosniano"
should be --Richard J. Cosmano--.

Col. 15, line 8, Claim 18 should read:

18. The coated abrasive product of claim 11, wherein the ratio of size of said premium abrasive grains to said erodable agglomerates ranges from about 2.5:1 to about 0.5:1.

Signed and Sealed this

Eleventh Day of January, 1994

Attest:

BRUCE LEHMAN

Attesting Officer         Commissioner of Patents and Trademarks